(12) United States Patent
Ishii et al.

(10) Patent No.: US 7,756,360 B2
(45) Date of Patent: Jul. 13, 2010

(54) IMAGE PROCESSING APPARATUS, IMAGE CAPTURING APPARATUS, IMAGE PROCESSING METHOD, AND COMPUTER PROGRAM

(75) Inventors: Toshisada Ishii, Tokyo (JP); Kenichi Mizukami, Kanagawa (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 961 days.

(21) Appl. No.: 11/526,114

(22) Filed: Sep. 25, 2006

(65) Prior Publication Data

US 2007/0081085 A1 Apr. 12, 2007

(30) Foreign Application Priority Data

Oct. 11, 2005 (JP) ............................. 2005-296465

(51) Int. Cl.
*G06K 9/32* (2006.01)
*H04N 5/76* (2006.01)
*H04N 5/46* (2006.01)
(52) U.S. Cl. .................. 382/298; 348/231.99; 348/556
(58) Field of Classification Search ................. 382/298, 382/299, 293; 348/556, 558, 555, 231.99; 715/200, 203, 204, 210
See application file for complete search history.

(56) References Cited

U.S. PATENT DOCUMENTS

| 6,157,410 | A | * | 12/2000 | Izumi et al. ................. 348/445 |
| 7,106,383 | B2 | * | 9/2006 | Kahn ......................... 348/556 |
| 2002/0131649 | A1 | * | 9/2002 | Yamaguchi ................. 382/275 |
| 2006/0015813 | A1 | * | 1/2006 | Chung et al. ................ 715/542 |

FOREIGN PATENT DOCUMENTS

| JP | 3383587 | 12/2002 |
| JP | 2003-153202 | 5/2003 |
| JP | 2004-201170 | 7/2004 |

* cited by examiner

*Primary Examiner*—Yon Couso
(74) *Attorney, Agent, or Firm*—Oblon, Spivak, McClelland, Maier & Neustadt, L.L.P.

(57) ABSTRACT

An image processing apparatus includes a signal processor which generates moving image data by performing data conversion on still image data, and a controller which determines an aspect ratio of the moving image data generated in the data conversion performed by the signal processor. The controller determines the aspect ratio of the moving image data generated in the data conversion by the signal processor on the basis of aspect ratio information of image data files recorded on a recording medium onto which the moving image data generated by the signal processor is recorded.

18 Claims, 6 Drawing Sheets

FIG. 3

| ASPECT RATIO OF MOVING IMAGE DATA RECORDED | ASPECT RATIO OF SLIDE-SHOW-FORM MOVING IMAGE DATA GENERATED BY DATA CONVERSION |
|---|---|
| ONLY 4:3 | 4:3 |
| ONLY 16:9 | 16:9 |
| BOTH 4:3 AND 16:9 | 4:3 (OR 16:9) |

FIG. 4

| ASPECT RATIO OF STILL IMAGE DATA RECORDED | ASPECT RATIO OF SLIDE-SHOW-FORM MOVING IMAGE DATA GENERATED BY DATA CONVERSION |
|---|---|
| ONLY 4:3 | 4:3 |
| ONLY 16:9 | 16:9 |
| BOTH 4:3 AND 16:9 | 4:3 (OR 16:9) |
| ALSO ASPECT RATIO DIFFERENT FROM 4:3 AND 16:9 | 4:3 (OR 16:9) |

IMAGE PROCESSING APPARATUS, IMAGE CAPTURING APPARATUS, IMAGE PROCESSING METHOD, AND COMPUTER PROGRAM

CROSS REFERENCES TO RELATED APPLICATIONS

The present invention contains subject matter related to Japanese Patent Application JP 2005-296465 filed in the Japanese Patent Office on Oct. 11, 2005, the entire contents of which are incorporated herein by reference.

BACKGROUND OF THE INVENTION

1. Field of the Invention

The present invention relates to image processing apparatuses, image capturing apparatuses, image processing methods, and computer programs. In particular, the present invention relates to an image processing apparatus, image capturing apparatus, image processing method, and computer program for recording, as a data file playable as a slide show, still images captured by a camcorder, or the like, capable of recording both moving images and still images.

2. Description of the Related Art

Digital camcorders capture moving images and store data of the captured images on recording media such as digital versatile discs (DVDs), hard disks, or flash memories. In addition, in recent years, digital camcorders capable of recording not only moving images but also still images have been developed.

For example, for a camcorder that can record both moving images and still images as captured data on a DVD, a DVD player is used to play back the DVD having the captured data recorded thereon. However, many current DVD players can only play back moving images, and have no functions of reading and playing back JPEG (Join Photographic Experts Group) still image data files.

For the above DVD players having no still image playback functions, as a system enabling playback of still images captured by a camcorder, there is a data-conversion recording system in which, when still images are recorded on a DVD, instead of recording the still images as JPEG still image data, the JPEG still image data is converted into moving image data, for example, MPEG (Moving Picture Experts Group) moving image data before being recorded. This data-conversion recording system is employed in a type of camcorder. For example, such a particular type of camcorder can convert captured still images into MPEG moving image data playable as a slide show by a DVD player, and can record the MPEG moving image data.

In general, at the time of capturing moving images, in current camcorders, setting of an image capture mode can set the aspect ratio of captured image data to one of 16:9 and 4:3. In many cases, the aspect ratio of still image data obtained by digital camcorders capable of capturing both moving images and still images is 4:3. Thus, in a case in which, after being converted into moving image data, the moving image data is recorded on a recording medium such as a DVD by a camcorder of the related art which has a function of recording moving image data obtained by converting still image data, it is common that an aspect ratio set by the camcorder is fixed to 4:3.

In addition, with widespread use of high definition television in recent years, also a display aspect ratio has come to change from 4:3 to 16:9. When a DVD player is used for playback, there is an increasing chance that pictures based on still image data are also viewed using a television having an aspect ratio of 16:9. With the above change, digital camcorders also come to include a type of camcorder capable of recording still images each having an aspect ratio of 16:9.

Use of such a type of camcorder results in producing a mixture of still images captured with an aspect ratio of 4:3 and still images captured with an aspect ratio of 16:9. In a case in which, when still images captured by the camcorder are represented by still image data having an aspect ratio of 16:9, the still image data is converted into moving image data and the moving image data is recorded on a recording medium, it is preferable that the moving image data be recorded not having an aspect ratio of 4:3 but an aspect ratio of 16:9.

The aspect ratio of moving image data obtained by conversion can be selected by a user. However, in order to select an appropriate aspect ratio, it is necessary for the user to set the aspect ratio of moving image data obtained by conversion by confirming aspect ratios of data items recorded on the recording medium one by one. This operation needs a lot of effort if the amount of the recorded data items is very large.

SUMMARY OF THE INVENTION

It is desirable to provide an image processing apparatus which records still images as, for example, moving image data files playable as a slide show, and which performs recording to a recording medium by automatically determining, depending of recorded data, an optimal aspect ratio used when the still images are recorded as moving image data, and an image capturing apparatus, image processing method, and computer program used therewith.

According to an embodiment of the present invention, there is provided an image processing apparatus including a signal processor which generates moving image data by performing data conversion on still image data, and a controller which determines an aspect ratio of the moving image data generated in the data conversion performed by the signal processor, wherein the controller determines the aspect ratio of the moving image data generated in the data conversion by the signal processor on the basis of aspect ratio information of image data files recorded on a recording medium onto which the moving image data generated by the signal processor is recorded.

Preferably, the image data files recorded on the recording medium may be moving image data files, and the processor may determine the aspect ratio of the moving image data generated by the signal processor on the basis of the aspect ratio information of the moving image data files.

The image data files recorded on the recording medium may be still image data files, and the processor may determine the aspect ratio of the moving image data generated by the signal processor on the basis of the aspect ratio information of the still image data files.

When the image data files recorded on the recording medium are moving image data files or still image data files, and all the moving image data files or the still image data files have a single aspect ratio, the controller may determine the single aspect ratio as the aspect ratio of the moving image data generated by the signal processor.

When the image data files recorded on the recording medium are moving image data files or still image data files, and the moving image data files or the still image data files have different aspect ratios, the controller may determine a predetermined aspect ratio as the aspect ratio of the moving image data generated by the signal processor.

When the image data files recorded on the recording medium are moving image data files or still image data files, and the moving image data files or the still image data files have different aspect ratios, the controller may determine, as the aspect ratio of the moving image data generated by the signal processor, an aspect ratio employed by a majority of the moving image data files or the still image data files.

When the still image data and the generated moving image data differ in aspect ratio, the signal processor may perform aspect ratio conversion by setting an aspect-ratio-adjusting data region in a periphery of a still image based on the still image data.

The signal processor may generate the moving image data in an MPEG form in the data conversion.

According to another embodiment of the present invention, there is provided an image capturing apparatus including a recording processor which captures and records moving images and still images onto a recording medium, a signal processor which generates moving image data by performing data conversion on still image data, and a controller which determines an aspect ratio of the moving image data generated in the data conversion performed by the signal processor, wherein the controller determines the aspect ratio of the moving image data generated in the data conversion by the signal processor on the basis of aspect ratio information of image data files recorded on a recording medium onto which the moving image data generated by the signal processor is recorded.

According to another embodiment of the present invention, there is provided an image processing method including the steps of, determining an aspect ratio of moving image data generated in data conversion, and executing signal processing by converting still image data into the moving image data on the basis of the determined aspect ratio, wherein, in the step of determining the aspect ratio, determination of the aspect ratio of the generated moving image data is executed on the basis of aspect ratio information of image data files recorded on a recording medium onto which the moving image data generated in the data conversion is recorded.

In the step of determining the aspect ratio, the image data files recorded on the recording medium may be moving image data files, and the determination of the aspect ratio of the generated moving image data may be executed on the basis of the aspect ratio information of the moving image data files.

In the step of determining the aspect ratio, the image data files recorded on the recording medium may be still image data files, and the determination of the aspect ratio of the generated moving image data may be executed on the basis of the aspect ratio information of the still image data files.

In the step of determining the aspect ratio, when the image data files are moving image data files or still image data files, and all the moving image data files or the still image data files have a single aspect ratio, the single aspect ratio may be determined as the aspect ratio of the generated moving image data.

In the step of determining the aspect ratio, when the image data files recorded on the recording medium are moving image data files or still image data files, and the moving image data files or the still image data files have different aspect ratios, a predetermined aspect ratio may be determined as the aspect ratio of the generated moving image data.

In the step of determining the aspect ratio, when the image data files recorded on the recording medium are moving image data files or still image data files, and the moving image data files or the still image data files have different aspect ratios, an aspect ratio employed by a majority of the moving image data files or the still image data files may be determined as the aspect ratio of the generated moving image data.

When the still image data and the generated moving image data differ in aspect ratio, in the step of executing the signal processing, aspect ratio conversion may be performed by setting an aspect-ratio-adjusting data region in a periphery of a still image based on the still image data.

In the step of executing the signal processing, the moving image data may be generated in an MPEG form in the data conversion.

According to another embodiment of the present invention, there is provided a computer program for allowing an image processing apparatus to execute image processing, the computer program comprising the steps of, determining an aspect ratio of moving image data generated in data conversion, and executing signal processing by converting still image data into the moving image data on the basis of the determined aspect ratio, wherein, in the step of determining the aspect ratio, determination of the aspect ratio of the generated moving image data is executed on the basis of aspect ratio information of image data files recorded on a recording medium onto which the moving image data generated in the data conversion is recorded.

A computer program according to an embodiment of the present invention is a computer program that can be provided in a computer-readable form to a multi-purpose computer system capable of executing various types of program code by a storage medium or communication medium, for example, a storage medium such as a compact disc, a floppy disk, or a magneto-optical disc, or a communication medium such as a network. By providing such a computer program in a computer-readable form, processing in accordance with the program is realized by a computer system.

Other features and advantages of the present invention will become apparent by detailed description based on the following embodiment of the present invention and the accompanying drawings.

According to an embodiment of the present invention, in order to generate moving image data that can be played back by, for example, a DVD player, when creation of the moving image data from still images is executed by data conversion, an aspect ratio of converted data can be automatically determined on the basis of aspect ratio information of moving image data files and still image data files recorded on a recording medium onto which the converted data is to be recorded. Thus, input of setting information by a user, etc., are unnecessary, thus realizing efficient data conversion.

BRIEF DESCRIPTION OF THE DRAWINGS

FIG. 3 is a table illustrating settings for use in determining an aspect ratio of converted data on the basis of aspect ratio information of recorded moving image data;

FIG. 4 is a table illustrating settings for use in determining an aspect ratio of converted data on the basis of aspect ratio information of recorded still image data;

DESCRIPTION OF THE PREFERRED EMBODIMENTS

Details of an image processing apparatus, image capturing apparatus, image processing method, and computer program according to embodiments of the present invention are described below with reference to the accompanying drawings.

Figure 1:
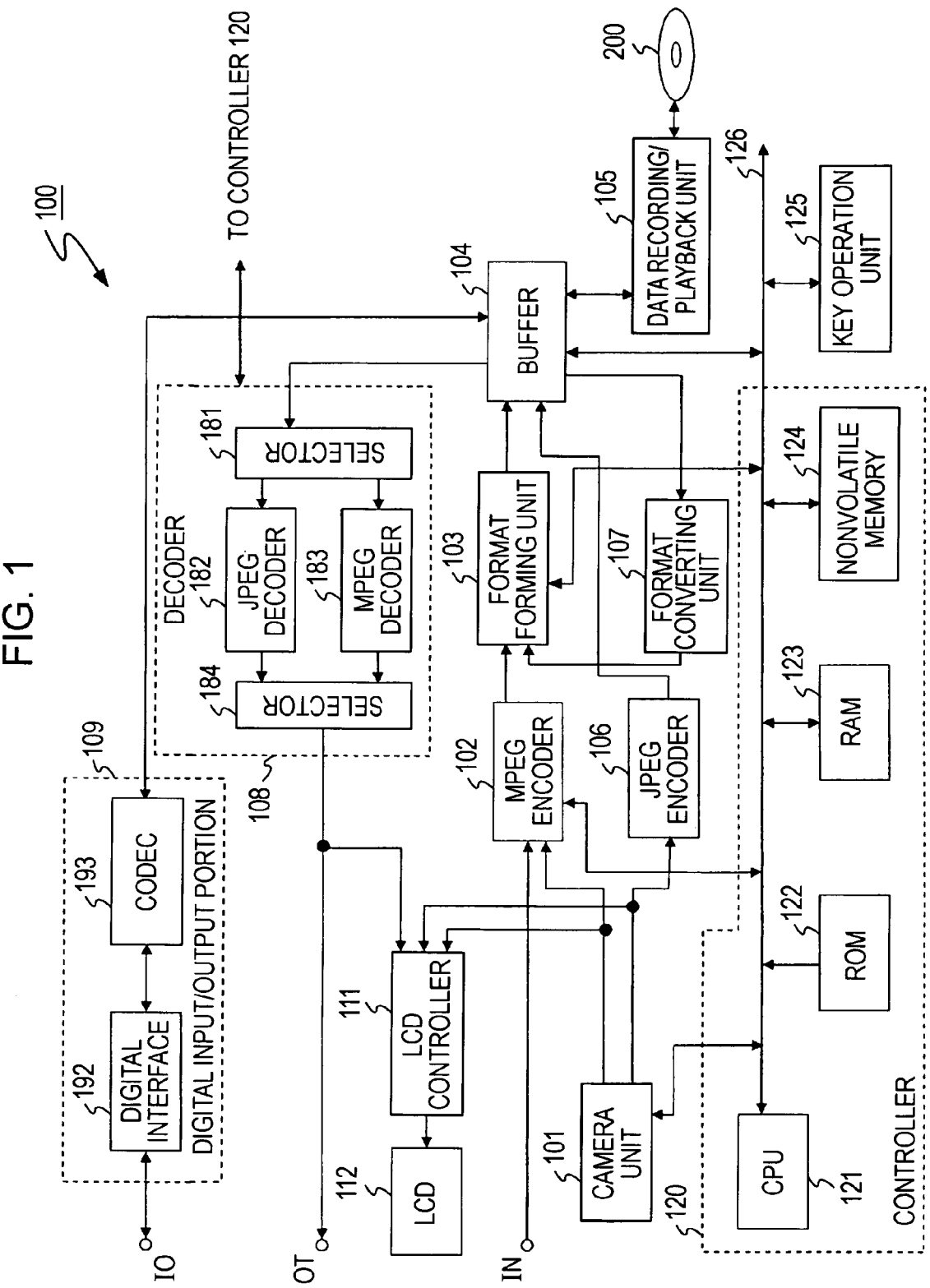
FIG. 1 is a block diagram showing a hardware configuration of an image capturing apparatus as an example of an image processing apparatus according to an embodiment of the present invention.

First, the configuration of an image capturing apparatus 100 is described below, as an example of an image processing apparatus according to an embodiment of the present invention, with reference to FIG. 1. The image capturing apparatus 100 shown in FIG. 1 is a DVD digital camcorder using a writable DVD as a recording medium for image capture data. The image capturing apparatus 100 has a configuration capable of capturing moving image data and still image data, and records moving image data and still image data on a recording medium 200 (as a DVD). The image capturing apparatus 100 also executes conversion on still image data recorded on the recording medium 200. For example, the image capturing apparatus 100 executes converting the still image data into moving image data (MPEG data) playable as moving images in a slide show form, and recording the moving image data on the recording medium 200.

As shown in FIG. 1, the image capturing apparatus 100 includes a recording processor including a camera unit 101, an MPEG encoder 102, a format forming unit 103, and a JPEG encoder 106, and a format converting unit 107, a buffer 104, and a data recording/playback unit 105.

As shown in FIG. 1, the image capturing apparatus 100 also includes a decoder 108 which includes selectors 181 and 184, a JPEG decoder 182, and an MPEG decoder 183, and which is used in a playback mode, and a digital input/output portion 109 which includes a codec 193 and a digital interface 192 (indicated by "I/F"), and which exchange digital data.

The digital input/output unit 109 is connected to digital input/output terminal IO, and can exchange digital data with another device through digital input/output terminal IO. In addition, information, such as image information obtained by decoding and digital-to-analog conversion in the decoding unit 108, is output through analog output terminal OT and can be supplied to an external device such as a monitor receiver.

In addition, an analog video signal and analog audio signal are input from an external device to the MPEG encoder 102 through input terminal IN. The MPEG encoder 102 performs analog-to-digital conversion and compression on the input signals to generate MPEG data, and can record the MPEG data on the recording medium 200.

The image capturing apparatus 100 according to this embodiment also includes an LCD (liquid crystal display) controller 111 and an LCD 112. Accordingly, the image capturing apparatus 100 can display playback images based on images recorded on the recording medium 200 on the LCD 112.

A controller 120 is a microcomputer which executes various types of control of each of the above-described blocks and which includes a central processing unit (CPU) 121, a read-only memory (ROM) 122, a random access memory (RAM) 123, and a nonvolatile memory 124 that are connected to one another by a CPU bus 126.

The ROM 122 stores various programs to be executed by the CPU 121 in the controller 120 and data necessary for processing. The RAM 123 is mainly used as a work area for temporarily storing results in the middle of processing. The nonvolatile memory 124 can store information even if its power is turned off, and is used to store various setting parameters, and results generated in the middle of processing which needs to be reliably stored.

In addition, the controller 120 connects to a key operation unit 125 including various operation keys and operation levers. By using the key operation unit 125, various instructions can be input from a user to the image capturing apparatus 100. Information corresponding to an instruction input from the user through the key operation unit 125 is supplied as an electric signal to the controller 120. This allows the controller 120 to control each block in response to instructions from the user, whereby the image capturing apparatus 100 can operate in response to instructions from the user.

The image capturing apparatus 100 executes the following processes:

(1) a moving image recording process;

(2) a still image recording process;

(3) a conversion process for converting recorded still images into moving images;

(3-1) a basic sequence of the conversion process; and (3-2) an automatic aspect-ratio-determination process in conversion from still images to moving images.

The above processes are described below.

(1) Moving Image Recording Process

As described above, the image capturing apparatus 100 can capture and record moving images on a DVD as the recording medium 200, and can capture and record still images on the DVD. The camera unit 101 includes a charge-coupled device and also has an electronic shutter function. For example, by operating the key operation unit 125, the user can capture and record moving images input from the camera unit 101 on the recording medium 200.

In the moving image recording process, a moving image signal is supplied from the camera unit 101 to the MPEG encoder 102, and is converted from analog to digital form to generate digital moving image data. The digital moving image data is compressed in accordance with MPEG and is supplied to the format forming unit 103. Under the control of the controller 120, the format forming unit 103 generates recording data that matches a recording format (digital moving image format) of the recording medium 200, and supplies the recording data to the buffer 104.

Writing/reading of the buffer 104 is controlled by the controller 120. The buffer 104 is used so that all the recording data can be completely recorded on the recording medium 200 in such a manner that, in a recording mode, time-base correction is performed on the recording data between the image capturing apparatus 100 and the recording medium 200. The buffer 104 is used in, for example, a first-in first-out (FIFO) manner. At the time of recording moving images, the recording data from the format forming unit 103 is sequentially written-into the buffer 104. Simultaneously, recording data already recorded in the buffer 104 is read and supplied to the data recording/playback unit 105.

The data recording/playback unit 105 includes an optical pickup, a biaxial actuator, and a sled motor, which are not shown, and records recording data at a predetermined position on the recording medium 200 under the control of the controller 120. In such a manner, the image capturing apparatus 100 records, as digital data, moving images captured by the camera unit 101 on the recording medium 200.

(2) Still Image Recording Process

Next, the still image recording process of the image capturing apparatus 100 is described below. The user operates the electronic shutter of the camera unit 101 by operating a shutter key of the key operation unit 125, whereby images captured by the camera unit 101 are acquired and recorded on the recording medium 200.

In still image recording, the still image signal is supplied from the camera unit 101 to the JPEG encoder 106 and is converted from analog to digital form to generate digital still image data. The digital still image data is compressed in accordance with JPEG to generate recording data in a JPEG format (digital still image format). The recording data is supplied from the JPEG encoder 106 to the data recording/playback unit 105 through the buffer 104, and the data recording/playback unit 105 records still image data on the recording medium 200.

As described above, whenever image capturing is performed, by recording the moving image data in the digital moving image format and the still image data in the digital still image format at appropriate positions on the recording medium 200, the image capturing apparatus 100 records a mixture of the moving image data and the still image data on the recording medium 200.

(3) Conversion Process for Converting Recorded Still Images into Moving Images (3-1) Basic Sequence of Conversion Process First, a basic sequence of the conversion process for converting recorded still images into moving images is described below. The image capturing apparatus 100 reads still image data recorded in the digital still image format on the recording medium 200 (for use in recording) with timing in response to an instruction of the user, or with timing in which the controller 120 determines that processing needs to be performed, such as timing in which the recording medium 200 (for use in recording) is ejected. The image capturing apparatus 100 converts the read data into data having the digital moving image format, and additionally records the converted data on the recording medium 200.

After the controller 120 uses the data recording/playback unit 105 to read the still image data recorded in the digital still image format on the recording medium 200, the controller 120 supplies the read still image data to the format converting unit 107 through the buffer 104. The format converting unit 107 converts, into MPEG I-picture data, the still image data (still image data compressed in accordance with JPEG) which has the digital still image format, and which is read from the recording medium 200 through the data recording/playback unit 105. In other words, the format converting unit 107 is a so-called "JPEG-format-to-I-picture converting unit" in which still image data decodable only by a JPEG decoder is converted into data decodable by an MPEG decoder.

The MPEG I-picture data converted from the still image data by the format converting unit 107 is supplied to the format forming unit 103. The format forming unit 103 generates recording data having a predetermined digital moving image format, for example, a DVD video format or a DVD video recording format.

When the format forming unit 103 is supplied with the MPEG I-picture data converted from the still image data, the format forming unit 103 generates recording data having a predetermined digital moving image format by forming all the MPEG I-picture data into a set of data (data for one chapter). The generated recording data is recorded on the recording medium 200 through the buffer 104 and the data recording/playback unit 105.

As described above, for moving image data, the image capturing apparatus 100 uses MPEG compression and performs recoding in a predetermined digital moving image format. For still image data, the image capturing apparatus 100 performs recording in a predetermined digital still image format such as the JPEG format. In addition, for still image data recorded in the digital still image format, the image capturing apparatus 100 performs conversion into MPEG I-picture data. After that, the image capturing apparatus 100 can record to add the obtained data to moving image data which is obtained by MPEG compression and which recorded in a predetermined digital moving image format.

Therefore, a playback apparatus, such as a DVD player, including an MPEG decoder, can play back and use both moving images and still images recorded in the digital moving image format on the recording medium 200.

(3-2) Automatic Aspect-Ratio-Determination Process in Conversion from Still Images to Moving Images Next, an automatic aspect-ratio-determination process, in conversion from still images to moving images, executed by an image processing apparatus such as the image capturing apparatus 100 in the embodiment of the present invention, is described below. The image capturing apparatus 100 executes automatic determination of the aspect ratio of moving images to be generated in the case of data conversion from still image data into a moving image format.

Specifically, on the basis of aspect ratio information of data files recorded on the recording medium 200 on which moving image data generated in data conversion is to be recorded, a process for determining an aspect ratio of the moving image data generated by the data conversion is executed.

As described above, the image capturing apparatus 100 shown in FIG. 1 reads still image data recorded in the digital still image format on the recording medium 200 (for use in recording) with timing in response to an instruction of the user, or with timing in which the controller 120 determines that processing needs to be performed, such as timing in which the recording medium 200 (for use in recording) is ejected. The image capturing apparatus 100 converts the read data into data having the digital moving image format and additionally records the converted data on the recording medium 200.

Figure 2:
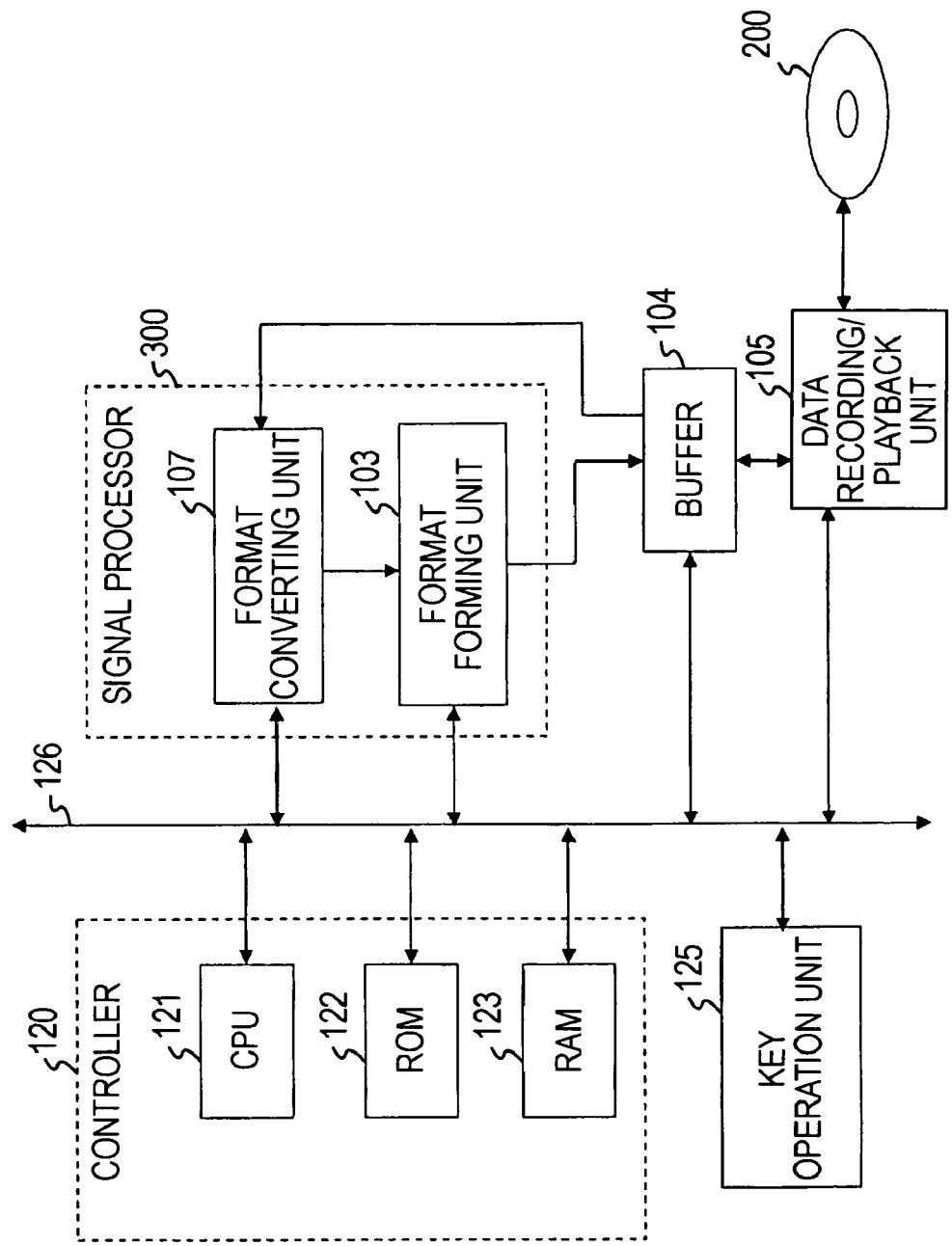
FIG. 2 is a block diagram showing blocks, extracted from the configuration shown in FIG. 1, for use when the data conversion is executed.

FIG. 2 is a block diagram showing blocks, extracted from the configuration of the image capturing apparatus 100 in FIG. 1, for use when the data conversion is executed. The controller 120, which controls the data conversion, includes the ROM 121 for executing the data conversion, the ROM 122 storing a processing program, and the RAM 123 used as a work area for storing parameters, etc.

A signal processor 300 includes the format converting unit 107 that converts the still image data (still image data compressed in accordance with JPEG) which has the digital still image format and which is read from the recording medium 200 through the data recording/playback unit 105 into MPEG I-picture data, and the format forming unit 103 that generates recording data having a predetermined digital moving image format, for example, the DVD video format or the DVD video recording format.

In addition, FIG. 2 shows the buffer 104, the data recording/playback unit 105, the recording medium 200, and the key operation unit 125.

For example, when a data conversion instruction is input from the user by using the key operation unit 125, with the recording medium 200 loaded into the image capturing apparatus 100, the controller 120 uses the data recording/playback unit 105 to read attribution information of data files, that is, moving and still image data files recorded on the recording medium 200. Specifically, reading of moving image title information and still image data information is executed and the read information is stored in a memory (the RAM 123) in the controller 120.

The controller 120 extracts aspect ratio information of each recorded data file on the basis of the attribution information of each data file stored in the memory (the RAM 123). Image size information for use in calculating aspect ratio information for each moving image title and aspect ratio information of still image data is included in the attribution information of each data file.

For example, the aspect ratio information of the still image data is calculated from image size data (vertical size and horizontal size of a main image) included in JPEG data. Regarding the moving image data, when a DVD is used as the recording medium 200, aspect ratio information is recorded in VTS_V-ATR in video title set information (VTSI) set in the DVD video format. The controller 120 extracts the aspect ratio of each of the data files recorded on the recording medium 200.

The controller 120 also executes data conversion, that is, a process for converting JPEG still images to MPEG moving images. First, the controller 120 controls the data recording/playback unit 105 to read still image data for one still image from the recording medium 200, and to input the read data to the format converting unit 107 in the signal processor 300 through the buffer 104.

The format converting unit 107 in the signal processor 300 converts the input JPEG data into MPEG moving image data. In this conversion, the controller 120 determines the aspect ratio of the moving image data obtained by the conversion on the basis of the aspect ratio information, stored in the RAM 123, of each data file on the recording medium 200, and inputs the determined aspect ratio information to the format converting unit 107. The format converting unit 107 generates a moving image data file by setting an aspect ratio in accordance with the aspect ratio information input from the controller 120 and executing the data conversion.

The controller 120 determines the aspect ratio of the moving image data (obtained by the data conversion) on the basis of the aspect ratio information of each data file on the recording medium 200. Specifically, for example, the controller 120 determines the aspect ratio of the moving image data in accordance with the settings shown in FIG. 3 or FIG. 4.

FIG. 3 shows settings for use in determining an aspect ratio of converted data on the basis of aspect ratio information of the moving image data recorded on the recording medium 200. FIG. 4 shows settings for use in determining an aspect ratio of converted data on the basis of aspect ratio information of the still image data recorded on the recording medium 200. On the basis of one of both sets of settings, the aspect ratio of the converted data is determined.

For example, when the settings shown in FIG. 3 are used, the aspect ratio of the converted data is determined in the following manners.

(a) When all the aspect ratios of moving image data files recorded on the recording medium 200 are 4:3, the aspect ratio of the converted data is set to 4:3.

(b) When all the aspect ratios of moving image data files recorded on the recording medium 200 are 16:9, the aspect ratio of the converted data is set to 16:9.

(c) When the aspect ratios of moving image data files recorded on the recording medium 200 consist of both 4:3 and 16:9, the aspect ratio of the converted data is set to one of aspect ratios of 4:3 and 16:9. In this case, by comparing the number of moving image files having an aspect ratio of 4:3 and the number of moving image files having an aspect ratio of 16:9, an aspect ratio in which the number of moving image files is greater may be set as the aspect ratio of the converted data.

As described above, on the basis of aspect ratio information of moving image data files recorded on the recording medium 200, by automatically determining an aspect ratio when moving image data is generated by the data conversion, input of setting information by the use, etc., are unnecessary, thus realizing efficient data conversion.

FIG. 4 shows the settings for use in determining the aspect ratio of the converted data on the basis of still image data files recorded on the recording medium 200.

For example, when the settings shown in FIG. 4 are used, the aspect ratio of the converted data is determined in the following manners.

(a) When all the aspect ratios of still image data files recorded on the recording medium 200 are 4:3, the aspect ratio of the converted data is set to 4:3.

(b) When all the aspect ratios of still image data files recorded on the recording medium 200 are 16:9, the aspect ratio of the converted data is set to 16:9.

(c1) When the aspect ratios of still image data files recorded on the recording medium 200 consist of both 4:3 and 16:9, and (c2) when the aspect ratios of still image data files recorded on the recording medium 200 have a mixture of aspect ratios different from 4:3 and 16:9, the aspect ratio of the converted data is set to one of aspect ratios of 4:3 and 16:9. In these cases, similarly to manner (c) for the moving image files, by comparing the number of still image files having an aspect ratio of 4:3 and the number of still image files having an aspect ratio of 16:9, an aspect ratio in which the number of the still image files is greater may be used as the aspect ratio of the converted data.

The format converting unit 107 in the signal processor 300 shown in FIG. 2 converts input JPEG data into MPEG moving image data on the basis of the aspect ratio determined by the controller 120. When, in this conversion, for example, the aspect ratio of the input still images and the determined aspect ratio of the converted data are equal to each other, no problem occurs. However, when the above aspect ratios differ, that is, when the aspect ratio of the input still images is 4:3 and the determined aspect ratio of the converted data is 16:9, or when the aspect ratio of the input still images is 16:9 and the determined aspect ratio of the converted data is 4:3, the format converting unit 107 performs processing for converting an aspect ratio to a different aspect ratio.

Figure 5A:
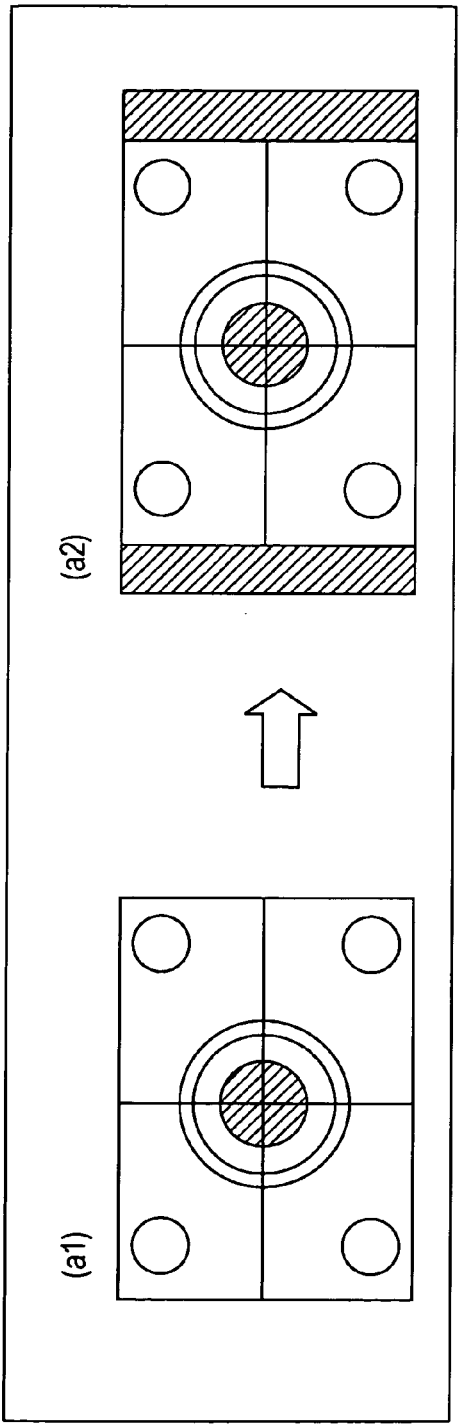
FIGS. 5A and 5B are illustrations of examples of aspect ratio converting processing executed by the image processing apparatus according to the embodiment of the present invention.
Figure 5B:
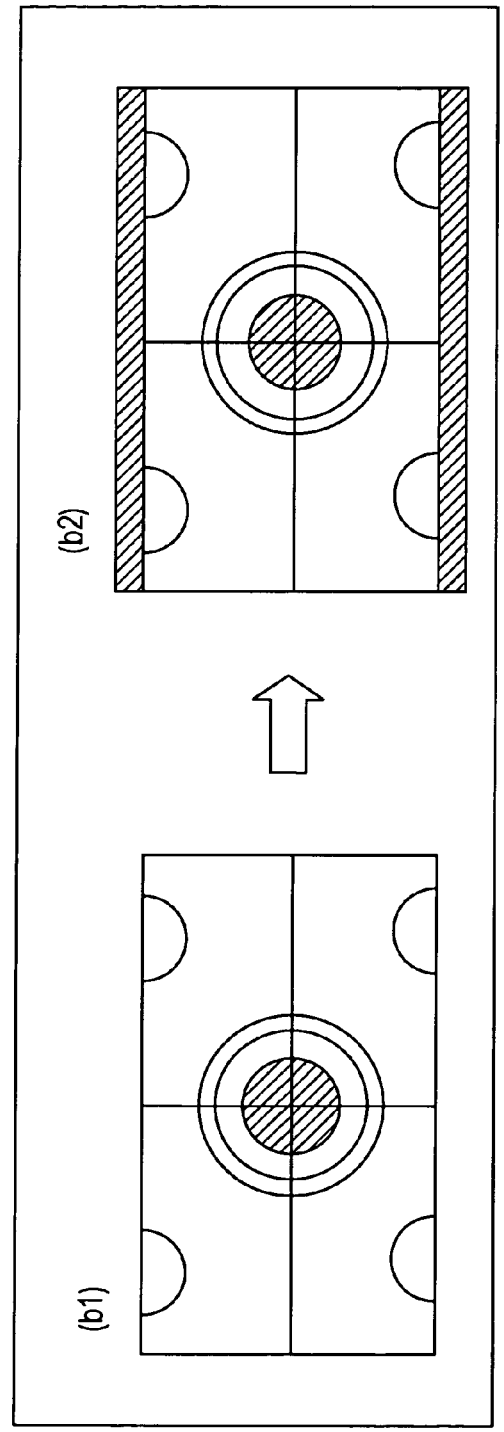

Referring to FIGS. 5A and 5B, examples of the processing for conversion to a different aspect ratio is described below.

FIG. 5A shows an example of the processing in a case in which the aspect ratio of input still images is 4:3 and the determined aspect ratio of converted data is 16:9. In this case, the format converting unit 107 in the signal processor 300 performs image conversion to an aspect ratio of 16:9 by processing the input still image, shown in part (a1) of FIG. 5A, having an aspect ratio of 4:3, so that, as shown in part (a2) of FIG. 5A, rectangular regions are added to the left and right of the original image.

FIG. 5B shows an example of the processing in a case in which the aspect ratio of input still images is 16:9 and the determined aspect ratio of converted data is 4:3. In this case, the format converting unit 107 in the signal processor 300 performs image conversion to an aspect ratio of 4:3 by processing the input still image, shown in part (b1) of FIG. 5B, having an aspect ratio of 16:9, so that, as shown in part (b2) of FIG. 5B, rectangular regions are added to the top and bottom of the original image.

When there is a difference in aspect ratio between still images to be converted and moving image data to be generated, as shown in FIGS. 5A and 5B, the format converting unit 107 in the signal processor 300 performs aspect ratio conversion by setting data regions for aspect ratio adjustment in still image peripheral portions. As described above, in accordance with an aspect ratio determined by the controller 120 on the basis of aspect ratio information of image data files, the format converting unit 107 executes processing for converting still images to MPEG moving images. The format converting unit 107 may execute aspect ratio changing processing by using extension and reduction of image data itself to perform data conversion.

The MPEG data generated in conversion by the format converting unit 107 is supplied to the format forming unit 103. The format forming unit 103 generates recording data in a predetermined digital moving image format, for example, the DVD video format, or in the DVD video recording format. The generated recording data is recorded on the recording medium 200 through the buffer 104 and the data recording/playback unit 105.

Figure 6:
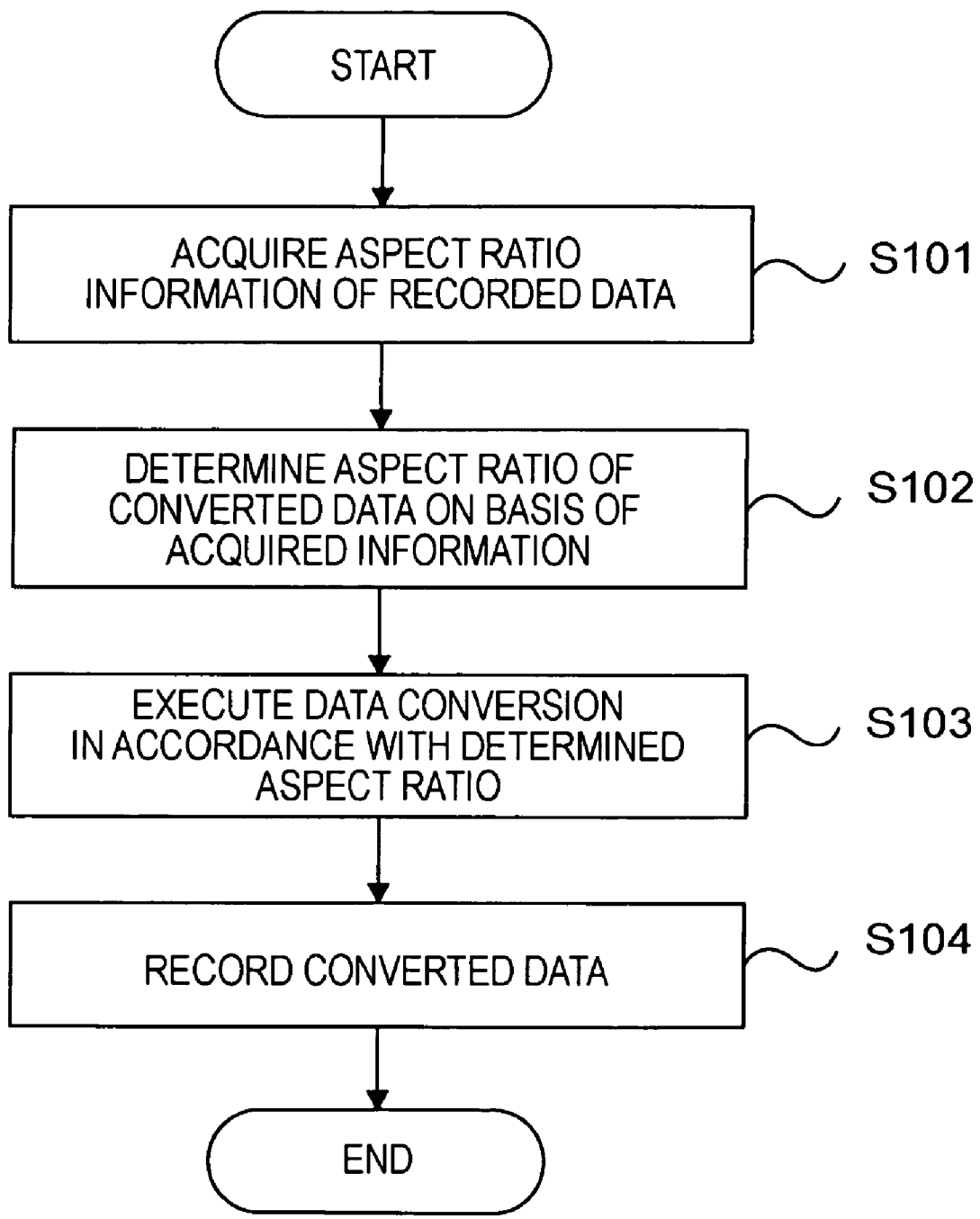
FIG. 6 is a flowchart illustrating a processing sequence executed by the image processing apparatus according to the embodiment of the present invention.

Referring to the flowchart of FIG. 6, a sequence of recording after conversion of still image data into moving image data, executed by the image capturing apparatus 100, is described below.

First, in step S101, after attribution information of data recorded on the recording medium 200 is acquired, aspect ratio information included in the attribution information is extracted.

In step S102, on the basis of the extracted aspect ratio information, an aspect ratio of converted data is determined. This aspect ratio is determined on the basis of the setting information described with reference to FIGS. 3 and 4. Which type of setting to be used for aspect ratio determination may be determined beforehand. Alternatively, it is possible that the user change settings, if necessary.

In step S103, on the basis of the determined aspect ratio, data conversion from still image data into moving image data is executed. This conversion is executed as processing by the format converting unit 107 and format forming unit 103 of the signal processor 300. In step S104, the moving image data generated by the conversion is recorded on the recording medium 200, and the sequence finishes.

As described above, in the embodiment of the present invention, the aspect ratio of moving image data generated by converting still image data is determined on the basis of aspect ratio information of moving or still image data files recorded on the recording medium 200. Thus, input of setting information by the user, etc., are unnecessary, thus realizing efficient data conversion.

The present invention has been described with reference to a particular embodiment. However, it is obvious for persons skilled in the art to modify and substitute the embodiment without departing from the gist of the present invention. In other words, an embodiment of the present invention has been disclosed in exemplified form. Thus, it should not be interpreted in limited sense. To determine the gist of the present invention, the appended claims should be considered.

In addition, the consecutive processing described in the specification can be executed by one of hardware and software, or a combination of both. When software is used, the processing can be executed by installing a processing sequence program into a memory in a built-in computer of dedicated hardware, or installing the program into a multipurpose computer capable of various types of processing.

For example, the program can be recorded in a hard disk or a ROM as a recording medium. Alternatively, the program can temporarily or eternally be stored (recorded) in a removable recording medium such as a flexible disk, a compact-disc read-only memory, a magneto-optical disc, a DVD, a magnetic disk, or a semiconductor memory. Such a removable recording medium can be provided as so-called "package software".

In addition to installation of the program from the removable recording medium into the computer, the program can be wirelessly transferred from a download site to the computer or can be transferred to the computer by wire through a network such as a local area network or the Internet, and the computer can receive and install the transferred program into a recording medium such as a built-in hard disk.

The processing steps described in this specification may not only be executed in a time-series manner in accordance with the description, but also be executed in parallel or separately, if necessary, or depending on processing capability of an apparatus that executes the steps. In addition, the system in this specification is a logical set of a plurality of apparatuses and is not limited to one in which the configurations of the apparatuses are accommodated in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    a signal processor which generates moving image data by performing data conversion on a plurality of still image data files to create a single moving image data file from the plurality of still image data files; and
    a controller which determines an aspect ratio of the moving image data generated in the data conversion performed by the signal processor,
    wherein the controller determines the aspect ratio of the moving image data generated in the data conversion by the signal processor on the basis of aspect ratio information of image data files recorded on a recording medium onto which the moving image data generated by the signal processor is recorded.

2. The image processing apparatus according to claim 1, wherein the image data files recorded on the recording medium are moving image data files; and the processor determines the aspect ratio of the moving image data generated by the signal processor on the basis of the aspect ratio information of the moving image data files.

3. The image processing apparatus according to claim 1, wherein the image data files recorded on the recording medium are the plurality of still image data files; and the processor determines the aspect ratio of the moving image data generated by the signal processor on the basis of the aspect ratio information of the plurality of still image data files.

4. The image processing apparatus according to claim 1, wherein, when the image data files recorded on the recording medium are the plurality of still image data files, and all the plurality of still image data files have a single aspect ratio, the controller determines the single aspect ratio as the aspect ratio of the moving image data generated by the signal processor.

5. The image processing apparatus according to claim 1, wherein, when the image data files recorded on the recording medium are the plurality of still image data files, and the plurality of still image data files have different aspect ratios, the controller determines a predetermined aspect ratio as the aspect ratio of the moving image data generated by the signal processor.

6. The image processing apparatus according to claim 1, wherein, when the image data files recorded on the recording medium are the plurality of still image data files, and the plurality of still image data files have different aspect ratios, the controller determines, as the aspect ratio of the moving image data generated by the signal processor, an aspect ratio employed by a majority of the plurality of still image data files.

7. The image processing apparatus according to claim 1, wherein, when the plurality of still image data files and the generated moving image data differ in aspect ratio, the signal processor performs aspect ratio conversion by setting an aspect-ratio-adjusting data region in a periphery of a still image data file based on the still image data file.

8. The image processing apparatus according to claim 1, wherein the signal processor generates the moving image data in an MPEG form by performing the data conversion.

9. An image capturing apparatus comprising:
a recording processor which captures and records moving images and still images onto a recording medium;
a signal processor which generates moving image data by performing data conversion on a plurality of still image data files to create a single moving image data file from the plurality of still image data files; and
a controller which determines an aspect ratio of the moving image data generated in the data conversion performed by the signal processor, wherein the controller determines the aspect ratio of the moving image data generated in the data conversion by the signal processor on the basis of aspect ratio information of image data files recorded on a recording medium onto which the moving image data generated by the signal processor is recorded.

10. An image processing method comprising:
determining an aspect ratio of moving image data generated in data conversion; and
executing signal processing by a hardware processor by converting a plurality of still image data files into a single moving image data file on the basis of the determined aspect ratio,
wherein, in the determining the aspect ratio, determination of the aspect ratio of the generated moving image data is executed on the basis of aspect ratio information of image data files recorded on a recording medium onto which the moving image data generated in the data conversion is recorded.

11. The image processing method according to claim 10, wherein in the determining the aspect ratio, the image data files recorded on the recording medium are moving image data files; and the determination of the aspect ratio of the generated moving image data is executed on the basis of the aspect ratio information of the moving image data files.

12. The image processing method according to claim 10, wherein: in the determining the aspect ratio, the image data files recorded on the recording medium are the plurality of still image data files; and the determination of the aspect ratio of the generated moving image data is executed on the basis of the aspect ratio information of the plurality of still image data files.

13. The image processing method according to claim 10, wherein, in the determining the aspect ratio, when the image data files are moving image data files or the plurality of still image data files, and all the moving image data files or the plurality of still image data files have a single aspect ratio, the single aspect ratio is determined as the aspect ratio of the generated moving image data.

14. The image processing method according to claim 10, wherein, in the determining the aspect ratio, when the image data files recorded on the recording medium are the plurality of still image data files, and the plurality of still image data files have different aspect ratios, a predetermined aspect ratio is determined as the aspect ratio of the generated moving image data.

15. The image processing method according to claim 10, wherein, in the determining the aspect ratio, when the image data files recorded on the recording medium are the plurality of still image data files, and the plurality of still image data files have different aspect ratios, an aspect ratio employed by a majority of the plurality of still image data files is determined as the aspect ratio of the generated moving image data.

16. The image processing method according to claim 10, wherein, when the plurality of still image data and the generated moving image data differ in aspect ratio, in the executing the signal processing, aspect ratio conversion is performed by setting an aspect-ratio-adjusting data region in a periphery of a still image data files based on the still image data files.

17. The image processing method according to claim 10, wherein, in the executing the signal processing, the moving image data is generated in an MPEG form in the data conversion.

18. A computer readable medium including computer executable instructions which, when loaded by a computer, cause the computer to execute an image processing method, the method comprising:
determining an aspect ratio of moving image data generated in data conversion; and
executing signal processing by a hardware processor by converting a plurality of still image data files into a single moving image data file on the basis of the determined aspect ratio,
wherein, in the determining the aspect ratio, determination of the aspect ratio of the generated moving image data is executed on the basis of aspect ratio information of image data files recorded on a recording medium onto which the moving image data generated in the data conversion is recorded.

* * * * *